(12) United States Patent
Severa et al.

(10) Patent No.: US 7,137,762 B2
(45) Date of Patent: Nov. 21, 2006

(54) DEVICE FOR TAPPING CONDUITS

(75) Inventors: Gerald Severa, Bad Hall (AT);
Andreas Pornbacher, Ternberg (AT)

(73) Assignee: agru Kunststofftechnick GmbH, Bad Hall (AT)

( * ) Notice: Subject to any disclaimer, the term of this patent is extended or adjusted under 35 U.S.C. 154(b) by 69 days.

(21) Appl. No.: 10/884,204

(22) Filed: Jul. 2, 2004

(65) Prior Publication Data

US 2005/0022387 A1    Feb. 3, 2005

Related U.S. Application Data

(63) Continuation of application No. PCT/EP03/00171, filed on Jan. 10, 2003.

(30) Foreign Application Priority Data

Jan. 12, 2002   (EP)   ................................. 02000745

(51) Int. Cl.
*B23B 41/08* (2006.01)
(52) U.S. Cl. ..................... 408/97; 408/226; 408/101; 408/138; 137/318
(58) Field of Classification Search ............... 408/226, 408/204, 141, 92, 95, 96, 97, 101, 138, 137; 137/315, 317, 318, 315.01; *B23B 41/08*
See application file for complete search history.

(56) References Cited

U.S. PATENT DOCUMENTS

| 3,302,493 | A | * | 2/1967 | Hulslander et al. | ............. 72/71 |
| 3,756,261 | A | * | 9/1973 | Minchhoff | ............... 137/15.14 |
| 3,896,842 | A | * | 7/1975 | Cole | ............ 137/318 |
| 3,995,655 | A | * | 12/1976 | Sands | ........... 137/318 |
| 5,345,964 | A | * | 9/1994 | Friedel | ......... 137/318 |
| 6,260,573 | B1 | * | 7/2001 | Lehmann et al. | ........... 137/318 |

FOREIGN PATENT DOCUMENTS

| DE | 19531913 | * | 3/1996 |
| DE | 196 41 803 A | | 4/1998 |
| DE | 100 21 592 A | | 11/2001 |
| DE | 10065576 A1 | * | 7/2002 |
| DE | 10127037 A1 | * | 12/2002 |
| DE | 10210844 A1 | * | 9/2003 |
| DE | 10320997 A1 | * | 12/2004 |
| EP | 0 723 104 A | | 7/1996 |

(Continued)

*Primary Examiner*—Monica Carter
*Assistant Examiner*—J Williams
(74) *Attorney, Agent, or Firm*—Jeff Rothenberg, Esq.; Heslin Rothenberg Farley & Mesiti P.C.

(57) ABSTRACT

A device for tapping a conduit, which conducts a flowing fluid, comprises a housing, which has a principal part, a fixing part running flush with the principal part for fixing to the conduit and an outlet part for discharging fluid from the tapped conduit. A rotating cutting device is provided in the principal part, said device being displaceable from a retracted first position into an extended second position, in which a section of the wall is cut out of the conduit. A telescopic shaft, which is fixed on one side to the principal part and on the other side to the cutting device, is provided. The telescopic shaft has at least two segments that can be displaced in relation to each other in a sealed manner and is fixed to the principal part in a sealed manner. The telescopic shaft does not protrude beyond the principal part as a result of its axial extensibility or retractability, thus ensuring a compact construction and ease of use.

13 Claims, 3 Drawing Sheets

FOREIGN PATENT DOCUMENTS

EP    0 736 718 A    10/1996

JP    05220609 A  *  8/1993

* cited by examiner

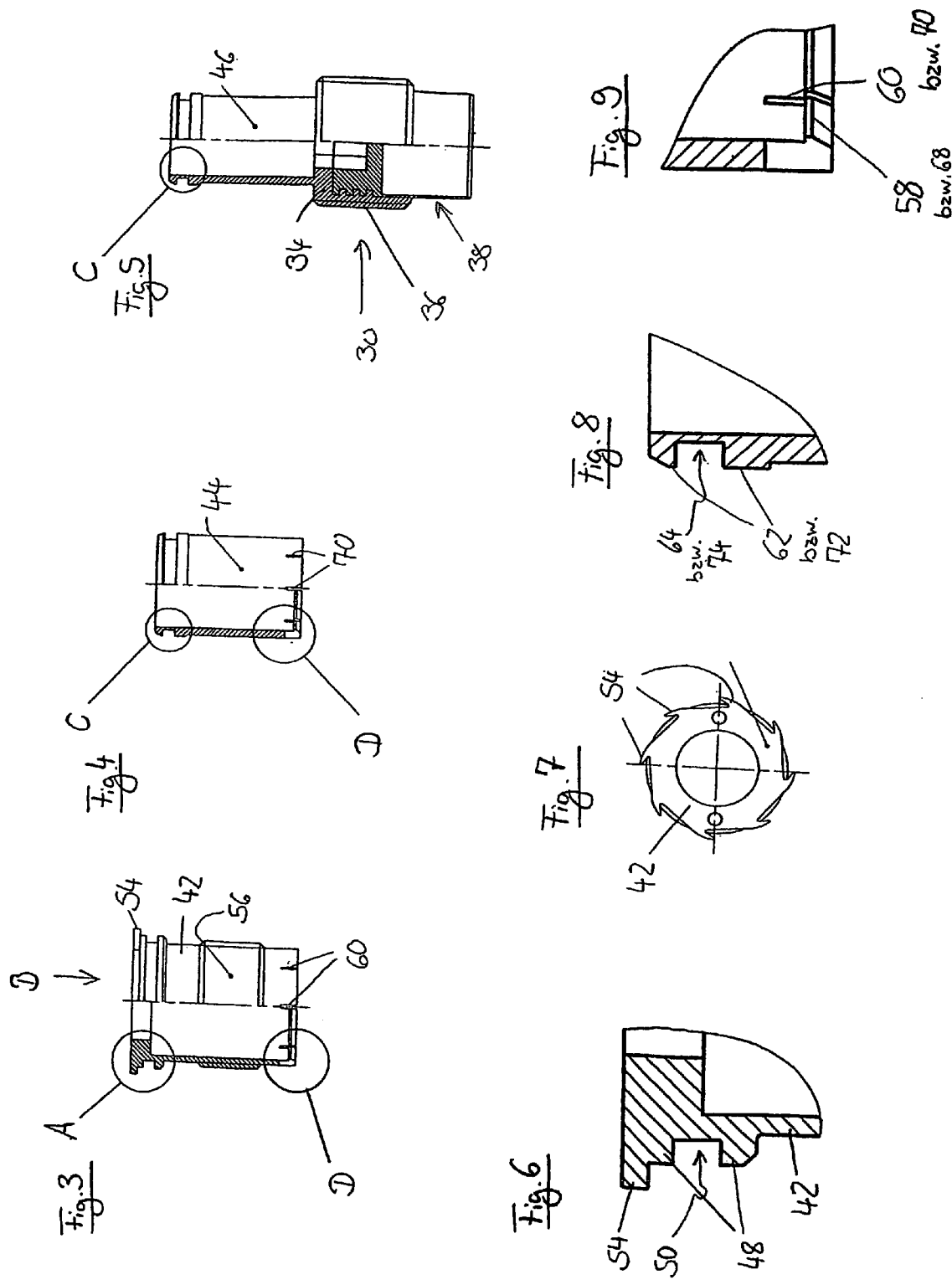

DEVICE FOR TAPPING CONDUITS

CROSS REFERENCE TO RELATED APPLICATIONS

Figure 1:
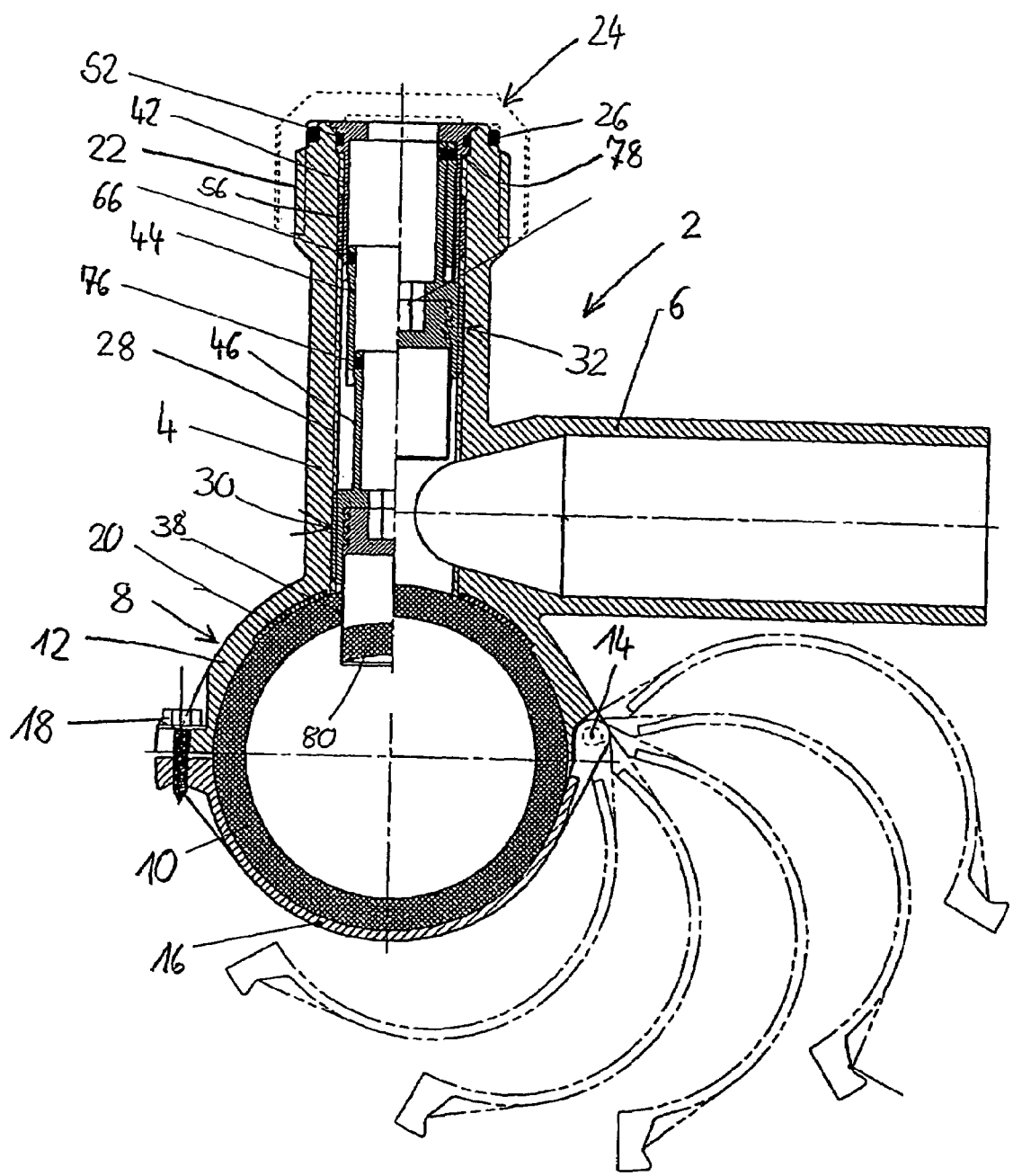

This application is a continuation of International Application PCT/EP03/00171 filed on Jan. 10, 2003, and published in German as International Publication WO 03/058111 on Jul. 17, 2003, and claims priority of European patent application number 02000745.6 filed on Jan. 12, 2002, the complete contents of these applications being incorporated by reference herein.

The present invention relates to a device for tapping conduits, such as for example plastic pipes, which conduct a flowing fluid, in order to branch off a part of the fluid and feed the same to an auxiliary device, a tapping point or suchlike Various devices for tapping conduits are known from the prior art which are essentially based on the same principle.

A tapping device is thus known for example from U.S. Pat. No. 4,063,844, which has a principal part with a fixing part arranged aligned behind it and an outlet part. The fixing part is designed in the manner of a clamp and can be clamped around a plastic pipe. A cutting device with a cylindrical cutter facing the fixing part is arranged in the principal part, which cutter is screwed onto an internal thread in the principal part. The cutting device can thus be screwed, by rotation of the same, from a retracted position into an extended position, whereby the cutter in the advanced position produces a hole in the wall of the pipe. The cutting device can then be rotated back together with the removed wall piece into the retracted position, so that a part of the fluid can be tapped through the created hole and via an outlet part. In order to be able to rotate the cutting device, a recess for the engagement of a turning tool is provided on its side facing away from the pipe, whereby the principal part is designed in such a way that the turning tool, such as for example an Allen wrench, can be advanced up to the recess.

An essential drawback with the known tapping device consists in the fact that it does not guarantee an adequate seal. After the hole has been produced in the pipe, especially when rotating back the cutting device into the retracted position, the fluid in the pipe, such as for example inflammable gas, can flow into the tapping device. Although this is desired and a large part of the fluid will flow through the outlet part to an auxiliary unit, there is however also the risk of the fluid flowing round the cutting device so as to be released to the surroundings via the principal part. This is due to the fact that the thread in which the cutting device is guided does not produce an adequate seal. A further outflow to the surroundings is not prevented until the removal of the turning tool and the fitting of a sealing cap.

The order to counter the problem of the deficient seal, there is proposed in EP 0 572 817 B1 a tapping stop valve which essentially has the same structure as the aforementioned device. In contrast with the latter, however, a spindle is provided, which is arranged inside the principal part. The spindle is on the one hand connected torsion-resistant with the cutting device and on the other hand projects, independently of the position of the cutting device, from the principal part. The rotation of the cutting device is brought about in this device by the fact that the turning tool is fitted at the projecting end so as to rotate the spindle. In order to prevent an outflow of fluid through the principal part to the surroundings, an annular body with several annular seals is provided between the spindle and the principal part, the tightness whereof remains intact independently of a rotary or axial movement of the spindle.

With the aforementioned tapping stop valve, the reliable fixing of the spindle as well as its straightforward removal after the branching off of the fluid has proved to be difficult. For this reason, EP 0 754 900 B1 proposes a tubular shaft instead of the spindle, whereby the shaft is fixed detachably to the cutting device. In order to achieve the rotation of the cutting device here, a turning tool is guided through the tubular shaft up to the recess for the engagement of the turning tool, as was already known from U.S. Pat. No. 4,063,844. As already described by reference to EP 0 572 817 B1, seals are provided between the shaft and the principal part, said seals producing sealing of the principal part independently of an axial motion of the shaft.

The devices known from publications EP 0 572 817 B1 and EP 0 754 900 B1 provide reliable sealing of the principal part, so that no fluid can get to the surroundings, but there are also accompanying drawbacks. If, for example, a spindle connected rigidly with the cutting device is provided (EP 0.572 817 B1), it necessarily emerges that the dimensions of the device are gray increased in the state during use, since the spindle bulges outwards. If a shaft is provided which is fixed detachably to the cutting device (EP 0 754 900 B1), the handling of the device is made difficult, since the shaft first has to be fitted and then removed again.

DE-A-196 41 803 describes a tapping stop valve, in which the rotationally actuatable cutting tool is screwed into an intermediate sleeve which for its part is screwed into the main connection piece. When the cutting tool is rotated, the intermediate sleeve can be screwed between a retracted position freeing the mouth of the branch piece and an extended position closing this mouth. The rotationally actuatable cutting tool does not have a shaft with which the tool is sealed against that the main connection piece. The drawback is that the production and assembly of the construction consisting of the cutting tool and the intermediate sleeve is relatively costly.

The problem underlying the present invention is to provide a device easy to produce and assemble for the tapping of a conduit which conducts a flowing fluid, which device has a compact structure and whose handling is simplified.

There is known from EP 0 736 718 A1 a tapping stop valve, with which the cutting bush has an external thread and the principal part of the housing has an internal thread, whereby both parts are screwed to one another. The actuation of the cutting tool takes place via a spindle mounted so as to be rotatable in the principal part. The drawback is that the tapping stop valve with the spindle construction has a relatively great axial length.

The device according to the invention is used for the tapping of a conduit, preferably of plastic pipes, which conducts flowing fluid, whereby fluid is understood to mean both gases as well as liquids. The device has a housing, which essay consists of a principal part, a fixing part aligned with the principal part for the fixing to the conduit and an outlet part for carrying away fluid from the tapped conduit. Inside the principal part there is arranged a able cutting device which has an external thread and a cylindrical cutting blade facing the fixing part. The external thread of the cutting device is screwed into an internal thread of the principal part, so that the cutting device can be turned from a retracted first position into an extended second position. In the second position, the cutting device is moved in the direction of the fixing part by a distance such that the cutting blade has cut out a wall piece out of the conduit. A shaft which extends inside the principal part, is fixed to the side of the cutting device facing away from the fixing part. According to the invention, the shaft is designed as a telescopic shaft with at least two segments that can be displaced in relation to each other in a sealed and sliding manner. The telescopic shaft can therefore be lengthened or shortened in the axial direction, whereby the seal between the segments can be achieved by means of conventional seals, such as for example by a sealing ring. With a section facing away from the cutting device, the telescopic shaft is also fixed to the principal part in a sealed and sliding manner, whereby in this case, too, the seal can be achieved for example by means of conventional sealing rings.

Due to the fact that the shaft is on the one hand fixed to the principal part and is on the other hand designed as a telescopic shaft it can remain permanently inside the device, i.e. there is no need for insertion and removal of the shaft, as a result of which the handling is facilitated. At the same time, the telescopic shaft at no time projects out of the principal part on account of its axial extensibility and retractability, so that the device has a very compact sure.

In a preferred form of embodiment of the device according to the invention, the segments are designed essentially sleeve-shaped and can be pushed into one another.

In order to guarantee that the sleeve-shaped segments are held together, the latter have, in a further preferred form of embodiment of the invention, a peripheral neck at the end pointing radially outwards, which neck can be gripped from behind by another segment. The peripheral neck pointing outwards therefore serves as a stop element, so that the segments cannot be displaced beyond a certain extent in the axial direction, as a result of which the tightness between the segments remains intact.

In a further preferred form of embodiment of the device according to the invention, at least one sleeve-shaped segment has a peripheral neck at the end pointing radially inwards, which neck can be gripped from behind. The outward pointing peripheral neck of another segment can be gripped from behind by the peripheral neck pointing radially inwards. If two segments connected together in this way have reached the maximum displacement with respect to one another, the neck pointing outwards and the neck pointing inwards strike against one another and prevent further displacement.

A simple and low-cost seal between the segments is achieved in a particularly preferred form of embodiment of the invention by the fact that a peripheral groove, into which a seal is inserted, is provided in the peripheral neck pointing radially outwards or the peripheral neck pointing radially inwards.

In a particularly preferred form of embodiment of the device according to the invention, at least one sleeve-shaped segment has longitudinal slots distributed peripherally at the end, which divide the peripheral neck pointing inwards or outwards. The longitudinal slots make it possible for the wall areas between the longitudinal slots to be pressed radially outwards or inwards more easily, so that the fitting together of the sleeve-shaped segments, in particular the passage of the peripheral necks against one another, is facilitated.

In order to design the connection between the telescopic shaft and the cutting device in a more reliable manner, the segment fixed to the cutting device is designed in one piece with the cutting device in a particularly preferred form of embodiment of the invention.

In a further advantageous form of embodiment of the device, the telescopic shaft has an external thread, by means of which the telescopic shaft is screwed fast to the principal part. The screw fixing represents a particularly straightforward and reliable option for the connection between the principal part and the telescopic shaft.

In order to prevent the rotation of the cutting device from loosening the screw fixing between the telescopic shaft and the principal part, the telescopic shaft in a preferred form of embodiment has at least one locking element which locks home when the telescopic shaft is fully screwed in, so that the telescopic shaft can no longer be unscrewed. For this purpose, a recess can for example be provided in the principal part, into which recess the locking element locks home. Unscrewing would only be possible if the locking element were to be destroyed. The locating element should therefore be designed suitably strong.

In a further advantageous form of embodiment of the device according to the invention, there is provided in the side of the cutting device facing the telescopic shaft a locating arrangement for a turning tool, whereby the turning tool can be introduced into the telescopic shaft. Locating arrangement can for example be understood to mean a recess, into which a screwdriver or an Allen wrench or hexagonal key can be suitably inserted.

In order to be able to use cutting blades with different diameters in the same device, the cutting device consists of a part having an external thread and the cutting blade itself, whereby the cutting blade can be exchanged.

In a particularly preferred form of embodiment of the invention, the cutting blade is screwed tight in the part having an external thread.

The invention will be explained below in greater detail with the aid of an example of embodiment making reference to be appended figures.

Figure 2:
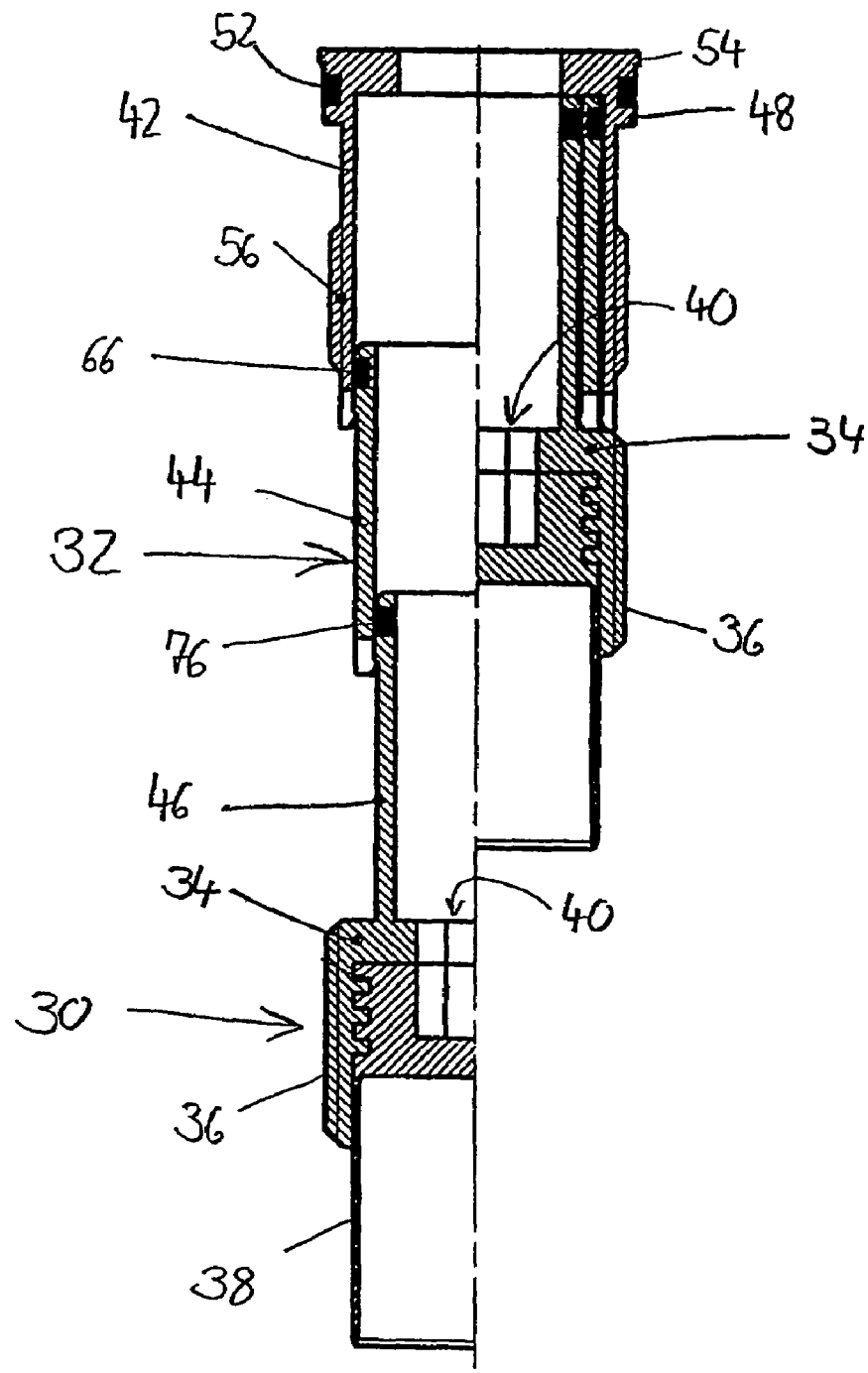

The figures show the following:

FIG. 1 a side view of the device according to the invention in a cross-sectional representation, FIG. 2 a side view of the telescopic shaft and the cutting device of FIG. 1 in an enlarged and cross-sectional representation, FIG. 3 a side view of the first segment of FIGS. 1 and 2 respectively in a partially cross-sectional representation, FIG. 4 a side view of the second segment of FIGS. 1 and 2 respectively in a partially cross-sectional representation, FIG. 5 a side view of the third segment and the cutting device of FIGS. 1 and 2 respectively in a partially cross-sectional representation, FIG. 6 detail A from FIG. 3 in an enlarged representation, FIG. 7 a plan view of the first segment in the direction of arrow B in FIG. 3, FIG. 8 detail C from FIGS. 4 and 5 in an enlarged representation and FIG. 9 detail D from FIGS. 3 and 4 in an enlarged representation.

The form of embodiment of the device according to the invention represented in FIG. 1 has an essentially T-shaped housing 2. Housing 2 includes a tubular principal part 4, into which a tubular outlet part 6 emerges. In alignment with principal part 4 in the axial direction, there is provided a fixing part 8 which serves to fix the device to a conduit 10, which in the present case is formed by a plastic pipe.

Fixing part 8 is designed in the manner of a clamp, i.e. it consists of a first arc-shaped part 12 mountable on conduit 10 and a second arc-shaped part 16 arranged in a swivelling manner about axle 14 on first part 12, whereby the swivelling capability is represented with the aid of the dashed representation of second arc-shaped part 16. In order to fix the device to conduit 10, first part 12 is mounted onto conduit 10 in order then to swivel second part 16 into a position surrounding conduit 10. In this position, both parts 12, 16 are clamped to one another by means of a screw 18, so that conduit 10 is surrounded tightly and securely. Heating wires 20, through which an electric current can flow, fun inside fixing part 8, or more precisely in first arc-shaped part 12 on the side facing conduit 10. When current flows through heating wires 20, electrofusion occurs in this area between the material of fixing part 8 and conduit 10, whereby the material of fixing part 8 is preferably also plastic. Heating wires 20 surround the opening of principal part 4 facing fixing part 8 preferably in an annular fashion, so that a good seal around the subsequent tapping hole is guaranteed.

In a distal section, i.e. facing away from fixing part 8, principal part 4 has an external thread 22 onto which a closure cap 24 can be screwed, which is only represented dashed in FIG. 1. A ring seal 26 is also provided between principal part 4 and closure cap 24, so that principal part 4 is sealed tight, whereby closure cap 24 serves solely as a safety device in case the seal described further back should fail. Principal part 4 further has an internal thread 28, which extends through the whole of principal part 4 in the present form of embodiment.

There are arranged in principal part 4 a cutting device 30 and a telescopic shaft 32, which are described in greater detail below by reference to FIGS. 2 to 9.

Cutting device 30 and telescopic shaft 32 from FIG. 1 are represented in FIG. 2, whereby the right-hand half of FIG. 2 shows cutting device 30 in a retracted first position and the left-hand half of FIG. 2 shows cutting device 30 in an extended second position with extended telescopic shaft 32. Cutting device 30 has a part 34 which is provided with an external thread 36, by means of which cutting device 30 can be screwed into internal thread 28 of principal part 4 (FIG. 1). Fixed to part 34 is a cylindrical cutting blade 38, which is facing fixing part 8 (FIG. 1). Part 34 and cutting blade 38 are screwed together, so that cutting blade 38 is exchangeable, or cutting blade 38 is cast into part 34, whereby cutting blade 38 is produced from a harder material than plastic, such as for example brass, and part 34 is made of plastic. On its side facing the telescopic shaft 32, cutting device 30 has a locating arrangement 40 for a turning tool (not shown), which in the present form of embodiment is designed as a recess with a hexagonal cross-section for locating a hexagonal key. The recess extends through part 34 into a distal section of cutting blade 38. This is advantageous, since the material of cutting blade 38 does not deform as easily as the plastic of part 34 in the presence of the loading due to the use of the turning tool.

Telescopic shaft 32 consists in the present form of embodiment of a sleeve-shaped first segment 42, a sleeve-shaped second segment 44 and a sleeve-shaped third segment 46, which can be displaced with respect to one another, i.e. third segment 46 is guided axially inside second segment 44 and second segment 44 is guided axially inside the first segment, so that segments 46 and 44 and, respectively, 44 and 42 can be pushed into one another.

First segment 42, which is represented in greater detail in FIGS. 3, 6, 7 and 9, has a peripheral neck 48 pointing radially outwards in a section facing away from second segment 44. There is provided in neck 48 a peripheral groove 50 (FIG. 6), into which a sealing ring 52 is inserted (FIG. 2). As can be seen in particular from FIG. 7, which shows a plan view of first segment 42 in the direction of arrow B of FIG. 3, locking elements 54 pointing outwards are also provided on the neck. First segment 42 also has an external thread 56, so that first segment 42 can be screwed into internal thread 28 of principal part 4 (FIG. 1). On its end facing second segment 44, first segment 42 has a peripheral neck 58 pointing radially inwards (FIG. 9). Furthermore, peripherally distributed longitudinal slots 60 are provided on this end, said longitudinal slots dividing neck 58 pointing inwards into individual sections. Neck 58 pointing inwards is chamfered or beveled on its side facing second segment 44, so that the introduction of second segment 44 into first segment 42 is simplified during the assembly of the device. Furthermore, longitudinal slots 60 simplify the introduction of second segment 44 into first segment 42, since the areas between longitudinal slots 60 can be pressed outwards more easily.

Second segment 44, which is represented in greater detail in FIGS. 4, 8 and 9, has a peripheral neck 62 pointing radially outwards in a section facing for segment 42. A peripheral groove 64 (FIG. 8), into which a sealing ring 66 is inserted (FIG. 2), is provided in neck 62. Neck 62 pointing radially outwards is chamfered or beveled on its side facing first segment 42, so that the introduction of second segment 44 into first segment 42 is simplified during the assembly of the device. Analogous to first segment 42, second segment 44 has a neck 68 pointing radially inwards and longitudinal slots 70 on its end facing third segment 46 (FIG. 9), whereby reference should be made here to the aforementioned description.

Inward pointing neck 58 of first segment 42 and outward pointing neck 62 of second segment 44 grip one behind the other in the assembled state, so that the latter strike against one another before second segment 44 can slide out of first segment 42, as is represented in FIG. 2, left-hand half. Sealing ring 66 prevents the penetration of fluid into telescopic shaft 32.

Analogous to second segment 44, third segment 46, which is shown in greater detail in FIGS. 5 and 8, has a neck 72 pointing radially outwards and a peripheral groove 74 in a section facing second segment 44, whereby a sealing ring 66 is inserted into groove 74 (FIG. 2). With regard to the design of neck 72 pointing outwards and groove 74, reference is made to the description of second segment 44. Third segment 46 is fixed to cutting device 30, whereby third segment 36 is designed as one piece with part 34 of cutting device 30, so that a very firm connection is present and no further sealing is required in the area of the connection point (FIG. 5).

As already described by reference to first and second segment 42, 44, inward pointing neck 68 of second segment 44 and outward pointing neck 72 of third segment 46 grip one behind the other in the assembled state, so that the latter strike against one another before third segment 46 can slide out of second segment 44, as is represented in FIG. 2, left-hand half. Sealing ring 76 in turn prevents the penetration of fluid into telescopic shaft 32.

In order to fix telescopic shaft 32 to principal part 4, external thread 56 on first segment 42 is screwed into internal thread 28 inside principal part 4 after cutting device 30 has been screwed into internal thread 28. The screwing-in is carried out until neck 48 pointing outwards lies with its face on a shoulder 78 inside principal part 4. In this position, locking elements 54 (FIG. 7) lock home into corresponding recesses (not shown) in principal part 4, so that unscrewing of first segment 42 is no longer possible and telescopic shaft 32 is thus securely fixed to principal part 4. Sealing ring 52 between principal part 4 and first segment 42 has the effect of preventing any fluid from escaping outwards between the two parts.

The mode of operation of the device according to the invention is described below by reference to FIG. 1. After fixing part 8 has been fixed to conduit 10 as described at the outset and welded to the latter by means of heating wires 20, cutting device 30 is located in a retracted first position represented in the right-hand half of FIG. 1. Telescopic shaft 32 is shortened in the first position, since segments 42, 44, 46 are pushed inside one another. In order to tap conduit 10, a turning tool, in this case a hexagonal key, has to be pushed through sleeve-shaped segments 42, 44, 46, which are accessible from the exterior, into locating arrangement 40 in the form of a recess. Cutting device 30 is rotated by rotating the turning tool. On account of the arrangement of cutting device 30 in internal thread 28, said cutting device is moved in translation in the direction of conduit 10. As soon as cutting blade 38 of cutting device 30 is adjacent to the latter, further rotary and feed motion of cutting device 30 causes cutting blade 38 to cut into the wall of conduit 10. The cutting procedure is carried out until cutting blade 30 has bored completely through the wall of conduit 10 and cutting device 30 is thus in an extended second position, which can be seen in the left-hand half of FIG. 1. Wall piece 80 cut out from the conduit is taken up in cylindrical cutting blade 38. Cutting device 30 is then moved back again into the first position by opposite rotation of the turning tool, whereby cut-out wall piece 80 remains in the cutting blade. The fluid flowing in conduit 10 can flow at least partially via the formed opening into outlet part 6 of the device, whereby sealing rings 52, 66 and 76 reliably prevent the fluid from escaping to the surroundings.

The invention claimed is:

1. A device for tapping a conduit conducting a flowing fluid comprising:
    a housing, which has a principal part, a fixing part aligned with the principal part for fixing to the conduit and an outlet part for carrying away fluid from a tapped conduit,
    a rotatable cutting device arranged inside the principal part, which cutting device has an external thread and a cylindrical cutting blade facing the fixing part, the external thread of the cutting device being screwed into an internal thread of the principal part, so that the cutting device can be turned from a retracted first position into an extended second position, in which a wall piece is cut out of the conduit, and
    a shaft arranged inside the principal part, a proximate end of the shaft being fixed to a side of the cutting device facing away from the fixing part,
    and the shaft comprising a telescopic shaft with at least two segments that can be displaced in relation to each other in a sealed manner, a distal end of said telescopic shaft being fixed to the principal part in a sealed manner with a section facing away from the cutting device.

2. The device according to claim 1, wherein the segments are essentially sleeve-shaped and can be pushed into one another.

3. The device according to claim 2, wherein a first sleeve-shaped segment has a peripheral neck pointing radially outwards at an end.

4. The device according to claim 3, wherein a second sleeve-shaped segment has a peripheral neck pointing radially inwards at an end whereby when said ends are engaged, the radially outwards pointing peripheral neck of the first segment is gripped from behind by the radially inwards pointing peripheral neck of the second segment.

5. The device according to claim 4 wherein a peripheral groove is provided in the peripheral neck pointing radially outwards or in the peripheral neck pointing radially inwards, and a sealing ring is inserted in said peripheral groove.

6. The device according to claim 4, wherein at least one of said first sleeve-shaped segment and said second sleeve-shaped segment has longitudinal slots distributed peripherally at an end, said slots dividing the peripheral neck pointing inwards or the peripheral neck pointing outwards into individual sections.

7. The device according to claim 1, wherein a segment fixed to the cutting device is constructed in one piece with the cutting device.

8. The device according to claim 1, wherein the telescopic shaft has an external thread at the distal end which is secured into said internal thread of the principle part, whereby the distal end of the telescopic shaft is screwed tight to the principal part.

9. The device according to claim 8, wherein the telescopic shaft has a least one locking element at said distal end, which locks home when the telescopic shaft is fully screwed in, so that the telescopic shaft can no longer be unscrewed.

10. The device according to claim 1, wherein a locating arrangement for a turning tool is provided on a side of the cutting device facing the telescopic shaft, whereby the turning tool can be introduced into the telescopic shaft.

11. The device according to claim 7, wherein the cutting device comprises a part having an external thread and securing the cutting blade, wherein the cutting blade is exchangeable.

12. The device according to claim 11, wherein the cutting blade is screwed fast or injected in the part having the external thread.

13. The device according to claim 4 wherein when said ends are engaged, also the radially inwards pointing peripheral neck is gripped from behind by the radially outwards pointing peripheral neck.

* * * * *